United States Patent [19]
Akira

[11] Patent Number: 5,629,753
[45] Date of Patent: May 13, 1997

[54] METHOD AND APPARATUS OF DETERMINING SETTINGS FOR PHOTOGRAPHIC PRINTING CONDITION

[75] Inventor: Toshiro Akira, Wakayama, Japan

[73] Assignee: Noritsu Koki Co., Ltd., Wakayama, Japan

[21] Appl. No.: 547,338

[22] Filed: Oct. 24, 1995

[30] Foreign Application Priority Data

Oct. 25, 1994 [JP] Japan ................................ 6-260418

[51] Int. Cl.$^6$ .................................................. G03B 21/52
[52] U.S. Cl. .................................................. 355/40; 355/39
[58] Field of Search .............................. 355/39, 40, 41, 355/42, 43, 35, 67, 68, 69, 71

[56] References Cited

U.S. PATENT DOCUMENTS

| | | | |
|---|---|---|---|
| 5,157,437 | 10/1992 | Takenaka | 355/41 |
| 5,231,451 | 7/1993 | Uekusa et al. | 355/29 |
| 5,253,011 | 10/1993 | Zahn et al. | 355/41 |
| 5,294,950 | 3/1994 | DuVall et al. | 354/109 |
| 5,477,353 | 12/1995 | Yamasaki | 358/487 |
| 5,555,073 | 9/1996 | Grossman et al. | 355/41 |

FOREIGN PATENT DOCUMENTS 64-3732 1/1989 Japan.
6-311338 11/1994 Japan.

*Primary Examiner*—R. L. Moses
*Assistant Examiner*—Shival Paul Virmani
*Attorney, Agent, or Firm*—Wenderoth, Lind & Ponack

[57] ABSTRACT

A method of determining settings for photographic printing condition comprises the steps of reading a plurality of identification codes from a negative film on which the identification codes are recorded at intervals of a given distance, and when the identification codes are found of two or more types, determining the settings corresponding to one of the types of which the number of the identification codes is the greatest.

2 Claims, 3 Drawing Sheets

METHOD AND APPARATUS OF DETERMINING SETTINGS FOR PHOTOGRAPHIC PRINTING CONDITION

BACKGROUND OF THE INVENTION

The present invention relates to a method of identifying the type of a negative film and determining the settings for printing the negative film of the type, and an apparatus for performing the method.

In printing of photographic negatives, their type has to be identified before determining the settings for printing condition. For the purpose, there has been proposed a photographic printing condition setting method where the identification code of each frame recorded on a negative film is electrically read during the transfer of the negative film, and examined by electrical computing actions for identifying the type of the negative film from which settings for printing condition are determined.

However, if the identification codes on the negative film are misread due to dirt on the film or fogging effects, its type will be identified incorrectly.

For enhancing the identification of the type of a negative film, a modified method of identifying the negative film is provided in which the type is determined only when two or more of the identification codes of the type are recognized (as depicted in Japanese Patent Application Publication 64-3732 (1989)).

The disadvantage of the modified method is such that when two or more of different types of the identification codes are read, it will hardly be possible to determine one correct type, leaving the need of a more sophisticated film type identifying method.

It is an object of the present invention, in view of the above predicament, to provide a method of determining settings for photographic printing condition which is capable of preventing misjudgment of the type of a negative film resulting from reading of fault identification codes.

SUMMARY OF THE INVENTION

A method of determining settings for photographic printing condition, according to the present invention, comprises the steps of: reading a plurality of identification codes from a negative film on which the identification codes are recorded at intervals of a given distance; when the identification codes are found of two or more types, determining the settings corresponding to one of the types of which the number of the identification codes is the greatest; and when the identification codes are found of one single type, determining the settings corresponding to the type of the identification codes.

A photographic printing condition setting apparatus according to the present invention comprises: a reader for reading a plurality of identification codes from a negative film on which the identification codes are recorded at intervals of a given distance; a memory for storage of the identification codes read by the reader; a searcher for retrieving the identification code of types from the memory; and an examiner for examining the identification codes retrieved by the searcher, when the identification codes are found of two or more types, determining the settings for printing conditions corresponding to one of the types of which the number of the identification codes is the greatest, and when the identification codes are found of one single type, determining the settings corresponding to the type of the identification codes.

In action, a series of the identification codes are read by the reader from the negative film and stored in the memory.

Then, the types of the identification codes stored in the memory are classified by the searcher.

When two or more of the types are found from the identification codes, the number of the identification codes of each type is counted by the examiner. A type of which the number of the identification codes is the greatest among the other types is then selected to identify the type of the negative film from which settings for printing the negative film are determined.

If one single type of the identification codes is only found, it is directly used for determining the settings for printing condition.

As described, the method and apparatus of the present invention allow the type of the identification code, from which settings for printing the negative film are determined, to be decided by majority, thus preventing any misjudgment of the type of the negative film resulting from reading of fault identification codes.

DETAILED DESCRIPTION OF THE PREFERRED EMBODIMENT

Figure 1:
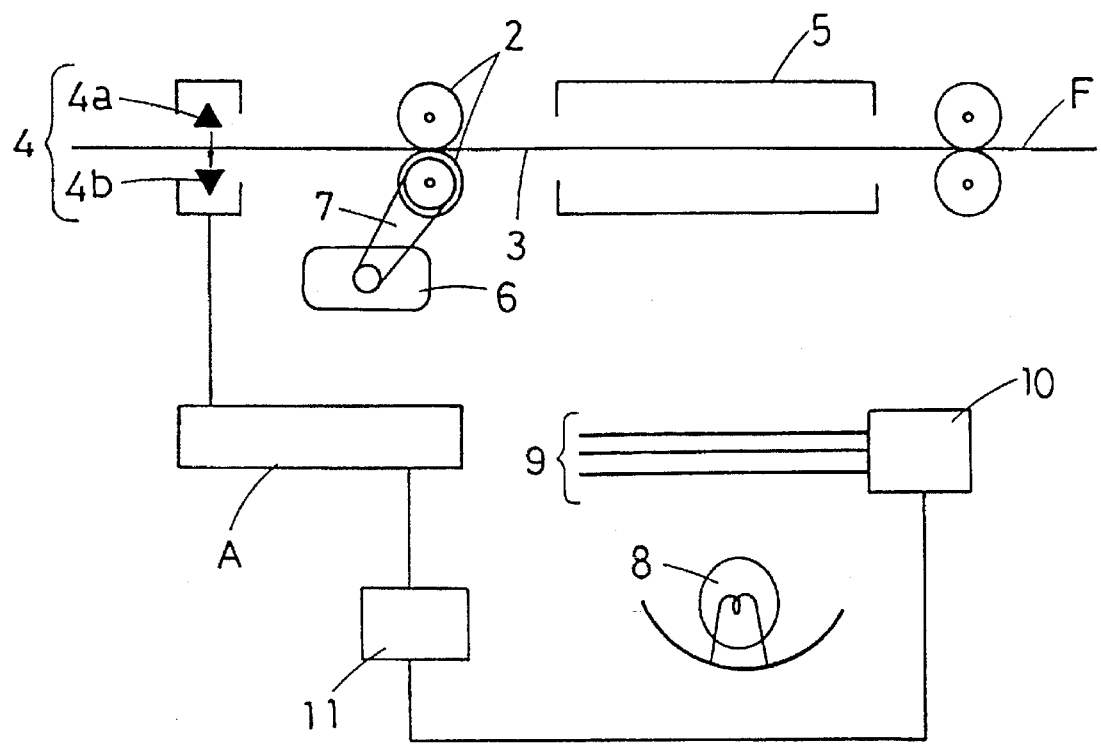
FIG. 1 is a schematic view of an automatic photographic printer equipped with a printing condition setting apparatus according to the present invention.

FIG. 1 illustrates an automatic photographic printer equipped with a printing condition setting device.

The automatic photographic printer includes a transfer path 3 along which a negative film F is conveyed with a pair of transfer rollers 2, and a reading means 4 and a printing stage 5 both arranged along the transfer path 3.

The reading means 4 comprises a light source 4a and a light sensor 4b.

The transfer rollers 2 are driven by a step motor 6 for conveying the negative film F on a frame-by-frame basis. For the purpose, a drive belt 7 is mounted between the transfer rollers 2 and the step motor 6.

There are also shown a printing light source 8, a light modulating filter 9, a filter driver mechanism 10, and a printing condition setting means 11.

The filter driver mechanism 10 is responsive to a control signal from the printing condition setting means 11 for moving the light modulating filter 9 to and from the light path between the printing light source 8 and the printing or exposure stage 5.

The printing condition setting means 11 is responsive to an identification signal from a printing controller means A (described later) in the printing condition setting device for producing and delivering the control signal to the filter driver mechanism 10. More specifically, it produces the control signal in response to the identification signal from the printing controller means A thus causing the filter driver mechanism 10 to actuate the light modulating filter 9 for passing a mode of light optimum for the type of the negative film F.

Figure 2:
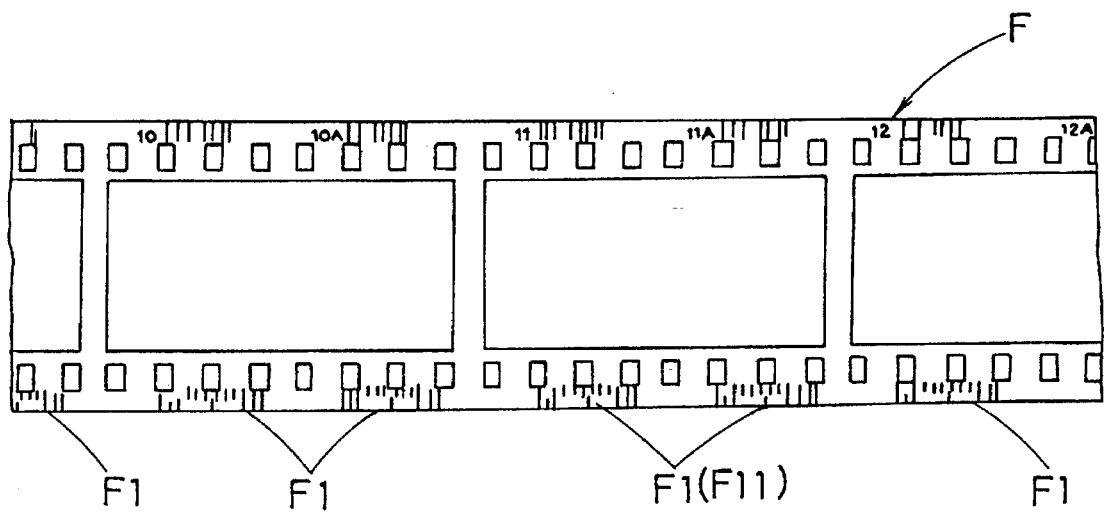
FIG. 2 is a plan view of a negative film on which identification codes are recorded at intervals of a given distance.

Each frame of the negative film F carries an identification code F1 which includes printing condition data such as sensitivity and name of a film manufacturer (FIG. 2).

In the printing condition setting device, the data of the identification code F1 read from the negative film F by the reading means 4 is examined by the printing controller means A to identify the type of the negative film F and thus determine settings for printing the film F (FIG. 1).

Figure 3:
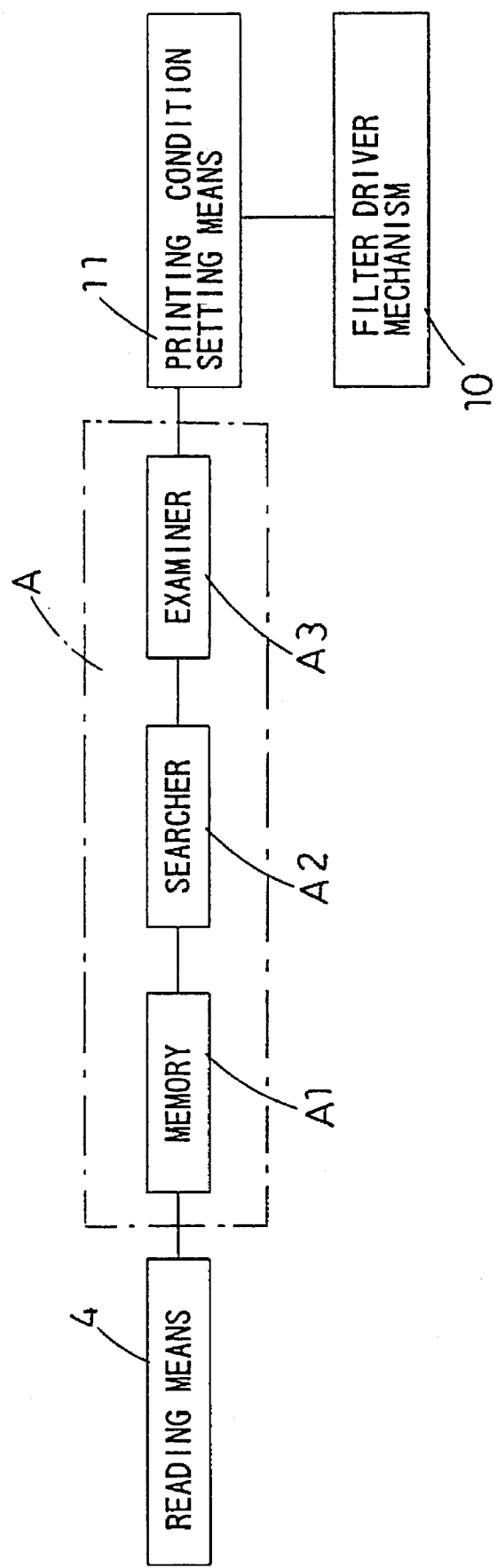
FIG. 3 is a block diagram of a printing controller means in the printing condition setting apparatus of the present invention.

FIG. 3 is a block diagram of the printing controller means A which comprises a memory A1, a searcher A2, and an examiner A3.

The memory A1 is adapted for storage of a series of the identification codes F1 read from the negative film F by the reading means 4.

The searcher A2 retrieves the identification codes F1 of types from the memory A1 when the first frame to be printed has been advanced to the printing stage 5.

The examiner A3 upon two or more types of the identification codes F1 being detected by the searcher A2 counts the number of the identification codes F1 of each type. After comparison, one of the types of which the number of the identification codes F1 is the greatest is transmitted as an identification signal to the printing condition setting means 11. If the identification codes F1 retrieved by the searcher A2 are classified into one single type, their type identification signal is delivered to the printing condition setting means 11.

Figure 4:
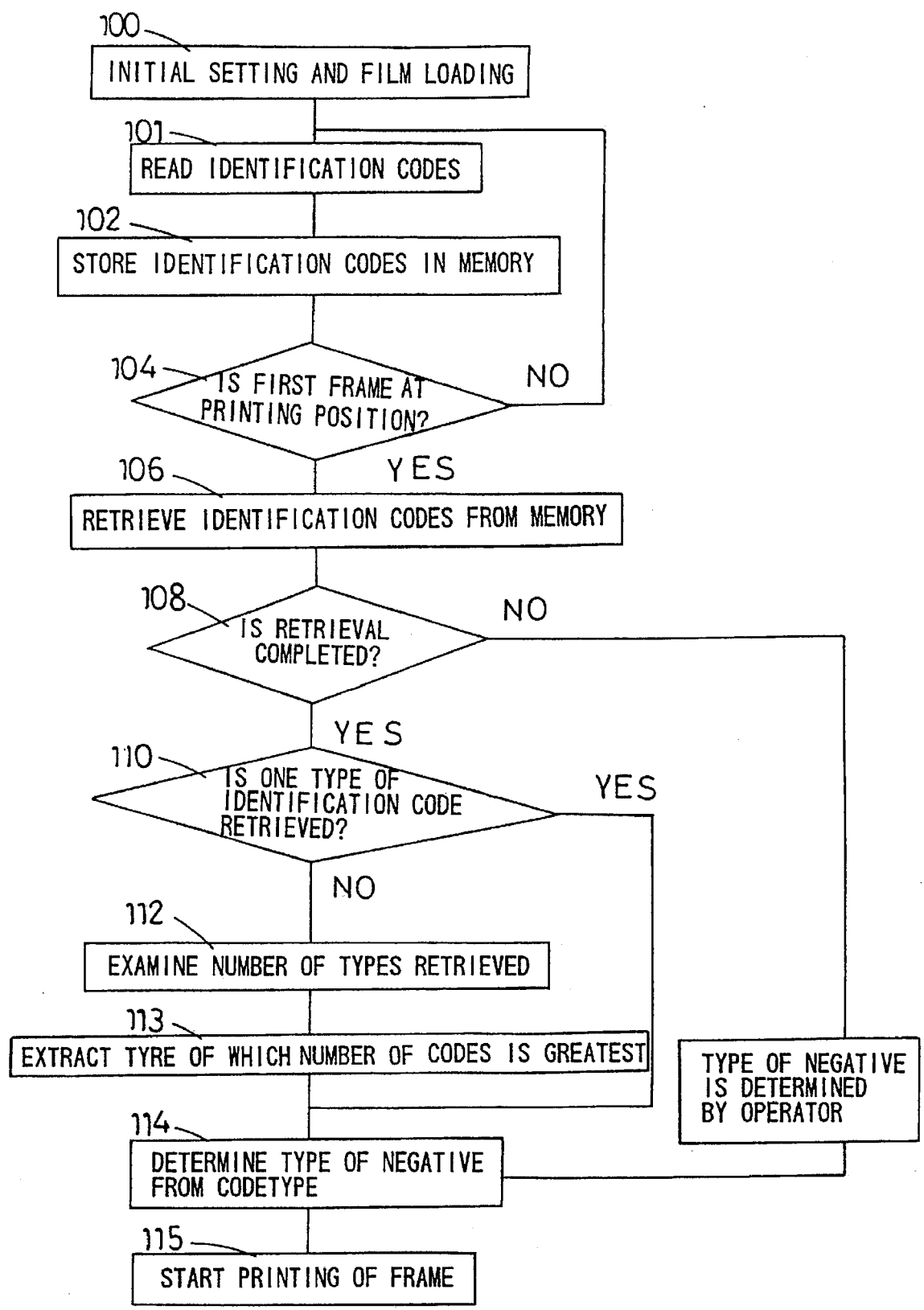
FIG. 4 is a flow chart showing actions of the printing condition setting apparatus of the present invention.

The action for printing in the automatic photographic printer equipped with the printing condition setting device of the embodiment will now be explained referring to the flow chart shown in FIG. 4.

(1) The negative film F is loaded to the transfer path 3 for starting a conveying action (Step 100).

(2) The identification codes F1 on the negative film F are read in a succession by the reading means 4 and stored in the memory A1 (Steps 101 and 102).

(3) By the time when the first frame of the negative film F arrives at the printing state 5, the identification codes F1 corresponding to a number of the frames passed have been read and stored in the memory A1 (Step 104).

(4) The identification codes F1 of types are retrieved from the memory A1 by the searcher A2 (Step 106).

(5) If non of the identification codes F is found, the light modulating filter 9 is manually actuated by an operator determining a type of the negative film F so that a mode of light optimum for printing the type of the negative film F is irradiated.

When the identification codes F1 are found, it is examined in the searcher A2 whether they are classified into one or more types (Step 110).

(6) If the identification codes F1 are classified into one single type, their type identification signal is released from the examiner A3. When the identification codes F1 are classified into two or more of the types, it is then determined by the examiner A3 one of the types of which the number of the identification codes F1 is the greatest and an identification signal indicative of the type is sent to the printing condition setting means 11 (Steps 112 to 114).

(7) The printing condition setting means 11 upon receiving the type identification signal actuates the light modulating filter 9 for passing a mode of light optimum for printing the type of the negative film F (Step 115).

(8) As the first frame of the negative film F departs the printing stage 5, the identification codes F1 stored in the memory A1 are updated subsequently.

(9) By repeating the above steps, each frame of the negative film F is examined for the type and printed under its optimum conditions.

As described previously, the negative film F is identified of the type when its first frame arrives at the printing stage 5 but remains not examined before reaching the printing stage 5. Accordingly, no unnecessary action is performed during the conveying of the negative film F.

(10) It is noted that for printing the last frame or near-last frame of the negative film F, the identification code F1 of the preceding frame is used for determining the type.

It may be possible that a row of identification codes F1 of which center is the identification code F1 of a frame to be printed are read and stored in the memory A1 for examining the type as one or more of the frames have been advanced and printed.

More particularly, the row of the identification codes F1 on the negative film F to be read comprises the identification code F1 (F11) of the frame to be printed, a given number of the identification code F1 located in the front of the identification code F11 or at the forward side of the transfer path, and the same number of the identification codes F1 as of the forward side codes located in the rear of the identification code F11 or at the loading side of the transfer path. The row of the identification codes F1 are read and stored in the memory A1, and when needed, retrieved from the memory A1 by the searcher A2 for examining the type.

As a plurality of the identification codes F1 on the negative film F are examined to extent, the type of the negative film F will be identified with minimum errors.

I claim:

1. A method of determining settings for photographic printing condition, comprising the steps of:

reading a plurality of identification codes from a negative film on which the identification codes are recorded at intervals of a given distance;

when the identification codes are found of two or more types, determining the settings corresponding to one of the types of which the number of the identification codes is the greatest; and when the identification codes are found of one single type, determining the settings corresponding to the type of the identification codes.

2. A photographic printing condition setting apparatus comprising:

a reader for reading a plurality of identification codes from a negative film on which the identification codes are recorded at intervals of a given distance;

a memory for storage of the identification codes read by the reader;

a searcher for retrieving the identification code of types from the memory; and an examiner for examining the identification codes retrieved by the searcher, when the identification codes are found of two or more types, determining the settings for printing conditions corresponding to one of the types of which the number of the identification codes is the greatest, and when the identification codes are found of one single type, determining the settings corresponding to the type of the identification codes.

* * * * *